M. E., J. P. & J. V. FOLEY & J. J. BUCHAN.
MANURE LOADER.
APPLICATION FILED JAN. 16, 1913.
1,083,878.
Patented Jan. 6, 1914.
2 SHEETS—SHEET 1.
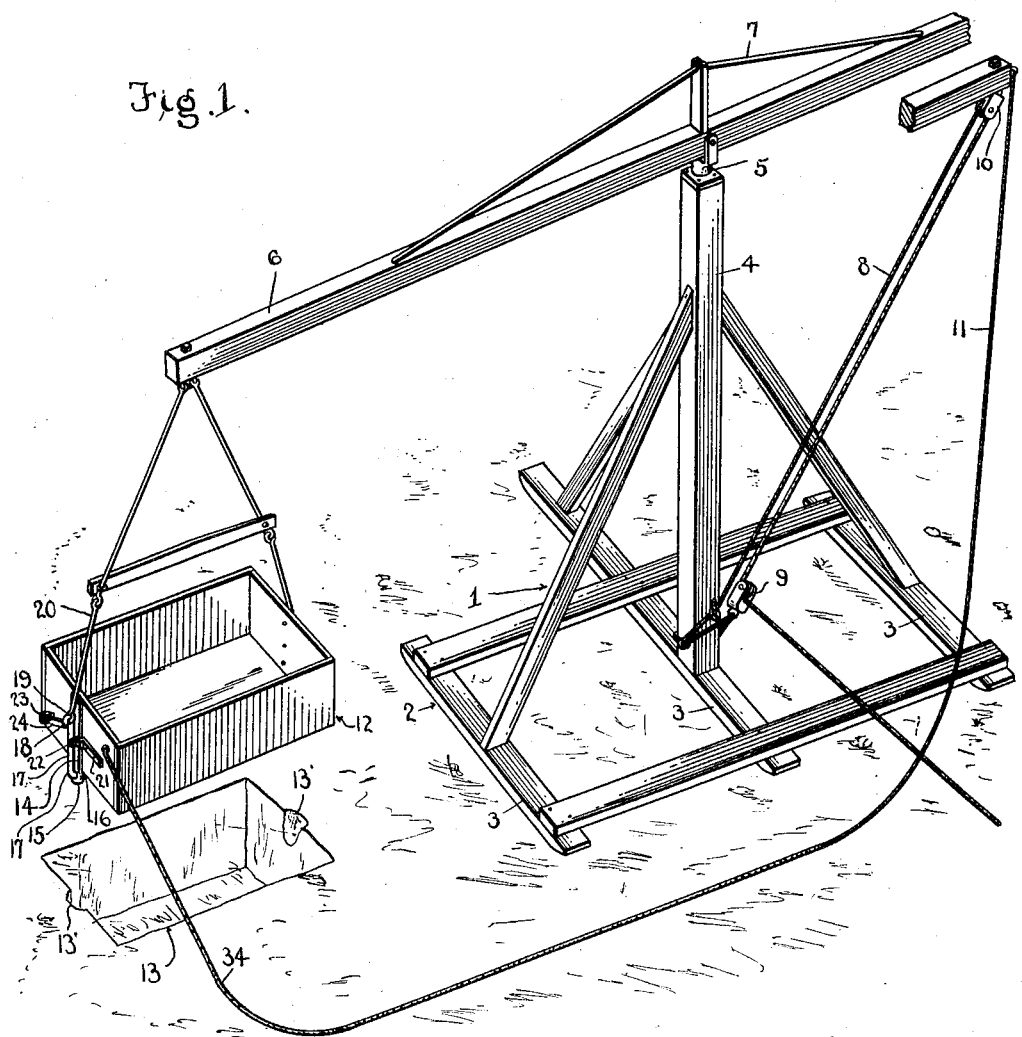
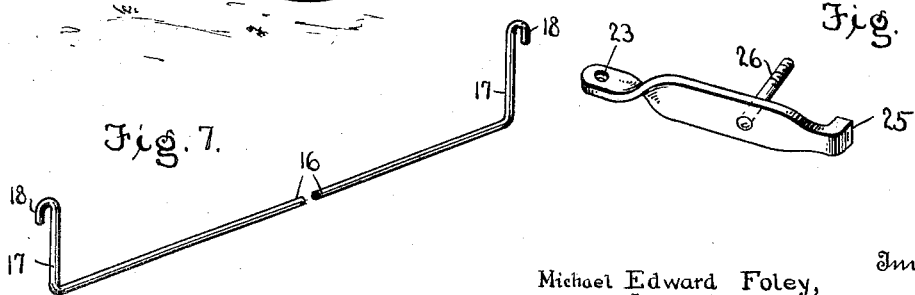
Witnesses
L. B. James
N. J. Collamer
Inventors
Michael Edward Foley,
Joseph P. Foley,
John V. Foley &
John J. Buchan
By H. B. Willson & Co.
Attorneys

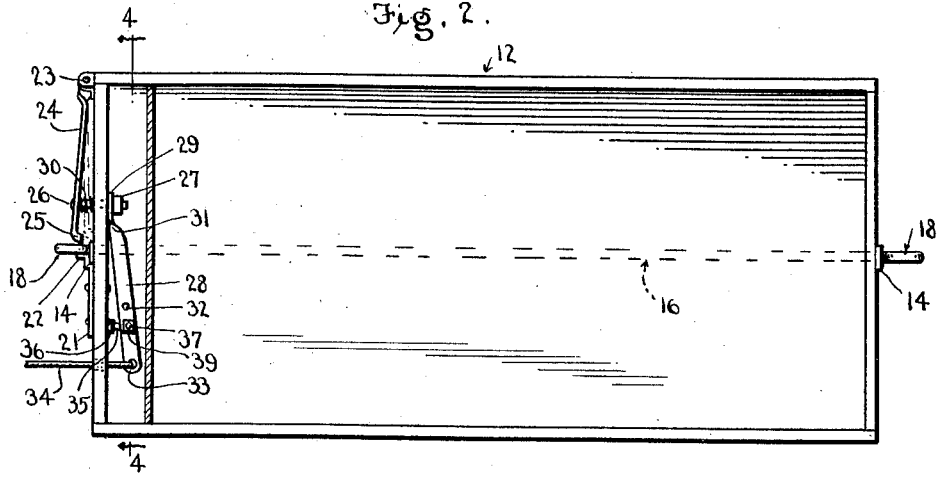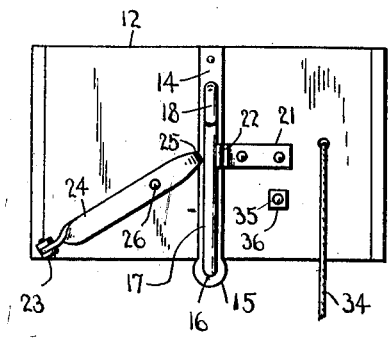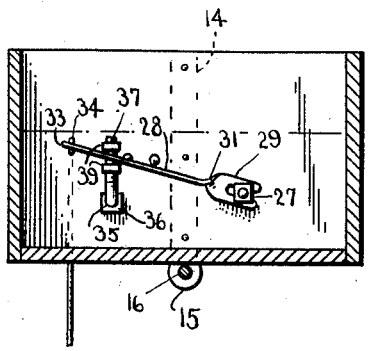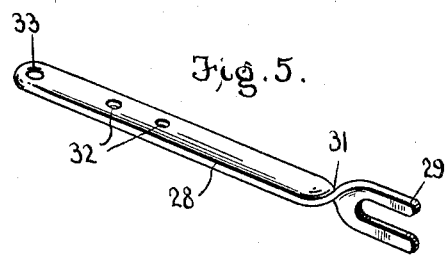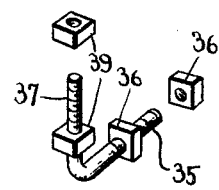

UNITED STATES PATENT OFFICE.

MICHAEL EDWARD FOLEY, OF MELVIN, IOWA, JOSEPH P. FOLEY, OF GARVIN, MINNESOTA, AND JOHN V. FOLEY AND JOHN J. BUCHAN, OF MELVIN, IOWA.

MANURE-LOADER.

1,083,878.  Specification of Letters Patent.  Patented Jan. 6, 1914.

Application filed January 16, 1913. Serial No. 742,516.

*To all whom it may concern:*

Be it known that we, MICHAEL EDWARD FOLEY, of Melvin, Osceola county, State of Iowa, JOSEPH P. FOLEY, of Garvin, Lyon county, State of Minnesota, and JOHN V. FOLEY and JOHN J. BUCHAN, of Melvin, Osceola county, State of Iowa, citizens of the United States, have invented certain new and useful Improvements in Manure-Loaders, of which the following is a full description.

This invention relates to hoisting, and more especially to buckets employed therein; and the object of the same is to produce an improved dumping bucket capable more especially for use in a machine for loading manure onto a wagon or other vehicle.

The object is accomplished by the construction hereinafter more fully described and claimed, and as shown in the drawings wherein—

Figure 1 is a general perspective view of this machine complete. Fig. 2 is a plan view of the bucket, and Fig. 3 is an end elevation thereof. Fig. 4 is a cross section on the line 4—4 of Fig. 2. Fig. 5 is a perspective detail of the lever, and Fig. 6 is a perspective detail of the pivot therefor. Fig. 7 is a perspective detail of the hanger. Fig. 8 is a perspective detail of the catch.

In the drawings the numeral 1 designates a suitable framework mounted on a base 2 which by preference has runners 3 so that it may be drawn over the ground to a proper point, and the framework supports a post 4 whose upper end carries a swivel 5 in which is pivoted a boom 6 suitably trussed as at 7. One extremity of this boom is connected by a hoisting rope 8 with a distant source of power (not shown), the rope leading over a pulley block 9 secured to the lower end of the post and around another pulley block 10 at one end of the boom, and when this rope is drawn upon it will be obvious that the boom is canted within its swivel in the ordinary manner.

The numeral 11 designates a swinging rope attached to that end of the boom which carries the pulley block 10 and when this rope is drawn upon the entire boom will be turned around the swivel in the top of the post 4 so as to carry the bucket attached to the other end of the boom to any suitable point.

The bucket in the present case may be and preferably is a rectangular box 12 which when not in use is sunk into a hole 13 in the ground so that the open upper end of the bucket is level with the surface of the ground, and from time to time we propose to scrape the manure accumulating on the ground into said box or bucket, or gather it thereinto in any suitable way. Secured to opposite ends of the bucket body are upright straps 14 having eyes 15 at their lower ends, and through said eyes passes the body 16 of a hanger best seen in Fig. 7, its ends 17 being upturned and formed into hooks 18 with which are adapted to be engaged eyes 19 at the lower extremities of a bail 20 carried by this end of the boom 6. For maintaining the ends 17 of the hanger in upright positions parallel with the straps 14 when the bucket is being raised and moved, and yet freeing them therefrom at times when it is desired to dump the bucket, we provide the following mechanism: Secured to one end of the bucket body at a proper point is an L-shaped keeper 21 whose foot 22 stands in position to be struck by the contiguous upright end 17 of the hanger as seen in Fig. 3; and pivoted at 23 to this end of the bucket on the other side of the strap 14 is a catch 24 best seen in Fig. 8 whose foot 25 coacts with the foot 22 to hold said end 17 upright as seen in full lines in Fig. 2, but which foot may be drawn in against the end of the box so that the end of the hanger can pass the same as seen in dotted lines in the same view. Connected with said catch between its ends is a bolt 26 which passes through a hole in the end of the box and receives a nut 27, and pivoted inside the box is a lever 28 having a fork 29 at one end which stands astride the bolt 26 behind its nut so that when the lever is actuated the entire bolt is drawn inward against the tension of the expansive spring 30 coiled on the bolt between the end of the box and the catch 24.

The lever is by preference made of strap metal and given a twist as seen at 31 in Fig. 5, its body being pierced with a number of holes 32 and with an eye 33 at its remote end, and with said eye is engaged the trip rope 34 which passes through a hole in the end of the bucket and is led to within reach of the operator. In Fig. 1 we have shown this trip rope and the swing rope 11 as constituting the opposite extremities of a single line which it is to be understood will be loose enough to permit its center to reach to the operator, and when he draws on one end of this rope he swings the boom whereas by drawing on the other end of the rope he trips the catch in a manner yet to be described. It is quite possible to so use but a single rope because, when the boom is swung by drawing in on one end, 11, it is necessary that the other end, 34, shall be paid out, and vice versa. The pivot for the lever is best seen in Fig. 6. It comprises an L-shaped bolt whose horizontal arm 35 passes through the end of the box, to which it is adjustably secured by two nuts 36; and whose upright arm 37 passes through one of the holes 32 in the lever 28, which latter is held thereon between two other nuts 39—thereby permitting the necessary and desirable adjustments. Finally the mechanism within this end of the box is by preference protected from the contents thereof by means of a hood or guard 40, which is shown in section in Fig. 2 and may consist simply of a board nailed across the body of this box at a slight distance from its end as illustrated. The hooked ends 18 of the hanger should rise sufficiently high to be above the center of gravity of the box and its contents and to be accessible to the operator when the box is in the hole 13, because he will have to pass the eyes 19 of the bail 20 down outside of the box and engage them with the said hooks, and possibly he may have to scrape away the dirt at the points 13' in order to do so. The parts are preferably entirely of wood, excepting the hardware and the ropes, and their dimensions and exact constructions may be altered at will.

The operation of this device is as follows: The hole is dug in the barnyard or at some point where manure accumulates, and the box is sunk therein level with or slightly below the surface of the earth, and perhaps the box is covered with planks until the time for its use arrives, in order that the stock will not get into the box. Then the planks are removed and by means of a suitable scraper or with an ordinary shovel the operator draws the manure to and into the box which will probably be of a size to fill a small-sized wagon, although it is quite possible to have two such boxes in a good-sized barnyard and of such capacity that jointly they would fill an ordinary farm wagon. Let us assume that there are two boxes, although but one is shown in Fig. 1. A team is hitched to the base 2 and it is drawn with its framework 1 and post 4 to a point say midway between the boxes, and here it comes to rest and may be staked to the ground. The block-and-tackle is then connected up as shown, and probably a whiffle-tree and horse will be attached to the outer end of the hoisting rope 8. The operator then draws down on the bail 20 until he can engage its eyes 19 with the hooks 18 of the hanger which stands beneath one of the boxes, and the rope or ropes 34 and 11 are attached as shown. The wagon to be loaded is backed up to a suitable point which would be the rear of Fig. 1, and the horse attached to the remote end of the hoisting rope 8 is started up; this raises the bucket 12 out of the hole 13 and to a height which is above the wagon body, and the operator then draws in on the rope 11 to swing the boom 6 until the bucket is directly over said wagon. Thereupon he draws upon the other rope 34 so that the lever 28 is turned on its pivot, its fork 29 behind the nut 27 draws the bolt 26 inward against the tension of the spring 30, and the catch is turned on its pivot 23 until its foot 25 contacts with the end of the box. The tension on the trip rope 34 will then pull the box in a direction which will be toward the reader in Fig. 1 and downward in Fig. 2, and it swings over its pivotal supports which are the eyes 15 at the lower ends of the straps 14 and therefore below the center of gravity. Meanwhile the ends 17 of the hanger 16 move relatively to the rear, that end which coacts with the catch moving past the latter and past its pivot 23 in a manner which will be clear. Thus the bucket is permitted to dump its load into the wagon and the strain on the horse or other lifting device is removed excepting for the weight of the bucket itself. The latter is then swung back to a position over the hole 13, the horse backed until the bucket comes within reach of the operator who steps up to it and rights it to the position shown in Fig. 1, and the horse then further backed until the bucket drops into the hole 13 and the eyes 19 of the bail are disengaged from the hooks 18. If there be another hole and box at the opposite side of the derrick, as suggested above, the swing rope 11 is then drawn upon until the boom is reversed from the position illustrated, and the operation at that side of the base 2 is repeated, excepting that in this instance the boom with its load will be swung in the opposite direction to bring the other box over the wagon and drop its contents thereinto. Both boxes (or many boxes if there are many) being finally returned to their holes in the ground, the base 2 and the superstructure mounted thereon can be drawn to a convenient place of storage and left there until further occasion for their use occurs.

We have thus described the uses of this structure although we do not wish to be limited strictly thereto, as it is quite clear that the hoisting mechanism and the dumping bucket could be used for other purposes, or the bucket itself might be used in connection with a different form of derrick.

What is claimed as new is:

1. The herein described bucket for manure loaders and the like consisting of a box open at its top and having a partition across its interior near one end, upright straps secured outside the ends of said box and having eyes at their lower extremities, a U-shaped hanger whose body is journaled in said eyes and whose ends are upturned outside the ends of said box and provided with hooks for connection with the hoisting mechanism, a catch normally engaging one of said hanger-ends to hold the same upright, and catch-tripping mechanism located within the box between the end of the latter and said partition.

2. The herein described bucket for manure loaders and the like consisting of a box open at its top and having a partition across its interior near one end, upright straps secured outside the ends of said box and having eyes at their lower extremities, a U-shaped hanger whose body is journaled in said eyes and whose ends are upturned outside the ends of said box and provided with hooks for connection with the hoisting mechanism, a catch normally engaging one of said hanger-ends to hold the same upright, a lever pivoted inside the box-end between the latter and said partition, connections between one end of said lever and said catch for tripping the latter, and a trip-rope leading from the other end of the lever through the box-end and to a remote point, for the purpose set forth.

3. The herein described bucket for manure loaders and the like consisting of a box open at its top and having eyes in its ends, a U-shaped hanger whose body is journaled in said eyes and whose ends are upturned outside the ends of said box and adapted for connection with the hoisting mechanism, a catch normally engaging one of said hanger-ends to hold the same upright, a lever pivoted inside the box-end, connections between one end of said lever and said catch for tripping the latter, and a trip rope leading from the other end of the lever to a remote point, for the purpose set forth.

4. In a hoisting bucket, the combination with the body, and a hanger pivotally mounted along the bottom of the same and having upturned ends with hooked extremities; of a keeper secured to one end of the box in position to be struck by one of said ends when the latter stands upright, a catch pivoted at its outer end to this end of the box and having a foot at its inner end adapted to engage said hanger end when the latter stands upright and against its keeper, a bolt projecting from the mid-length of said catch through the end of the box and having a nut at its inner end, an expansive spring coiled on said bolt between the box and catch, a lever pivoted within the box-body and having one end twisted and forked and passing astride said bolt behind its nut, and a trip-rope leading from the other end of said lever through the box-end and to a remote point, for the purpose set forth.

5. In a hoisting bucket, the combination with the body, and a hanger pivotally mounted along the bottom of the same and having upturned ends with hooked extremities; of a keeper secured to one end of the box in position to be struck by one of said ends when the latter stands upright, a catch pivoted at its outer end to this end of the box and having a foot at its inner end adapted to be engaged with said hanger-end when the latter stands upright and against its keeper, a bolt projecting from the midlength of said catch through the end of the box and having a nut at its inner end, an expansive spring coiled on said bolt between the box and catch, an L-shaped pivot whose horizontal arm passes through the box-end and is adjustably mounted therein by means of two nuts and whose upright arm stands within said box end and carries two nuts, a strap-metal lever standing within the box and pivoted between its ends on said upright arm with its inner end twisted and forked and engaging said catch-bolt behind its nut and its outer end pierced with an eye, and a trip-rope connected with said eye and passing through the box-end to a remote point, for the purpose set forth.

In testimony whereof we have hereunto set our hands in presence of two subscribing witnesses.

MICHAEL EDWARD FOLEY.
JOSEPH P. FOLEY.
JOHN V. FOLEY.
JOHN J. BUCHAN.

Witnesses:
EARL NASH,
G. A. SCHEE.

---

Copies of this patent may be obtained for five cents each, by addressing the "Commissioner of Patents, Washington, D. C."